April 1, 1952  R. E. HOLAHAN  2,591,261
CONFECTION MOLD
Filed Nov. 30, 1949  4 Sheets-Sheet 2
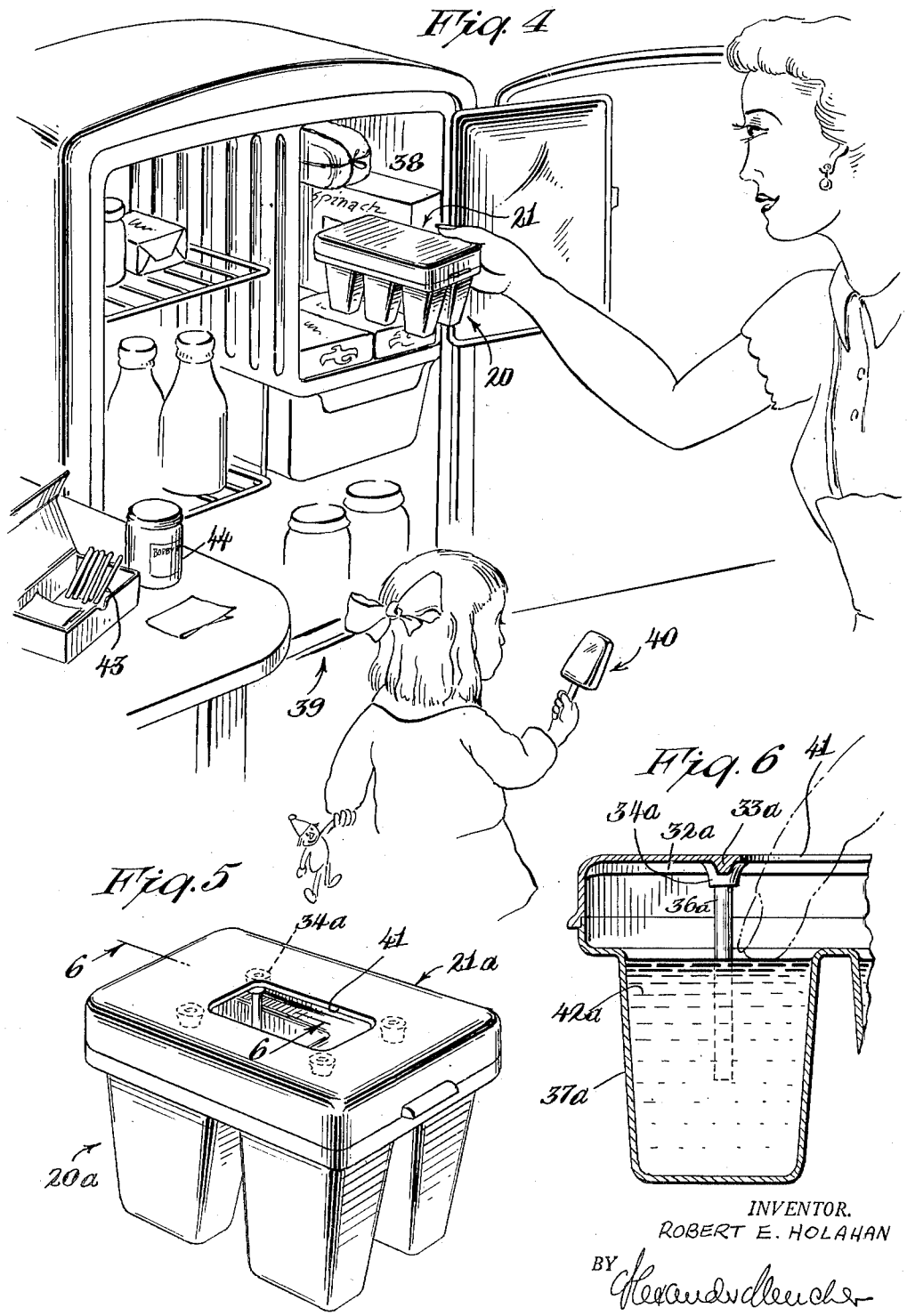
INVENTOR.
ROBERT E. HOLAHAN
BY
ATTORNEY April 1, 1952 — R. E. HOLAHAN — 2,591,261
CONFECTION MOLD
Filed Nov. 30, 1949 — 4 Sheets-Sheet 3
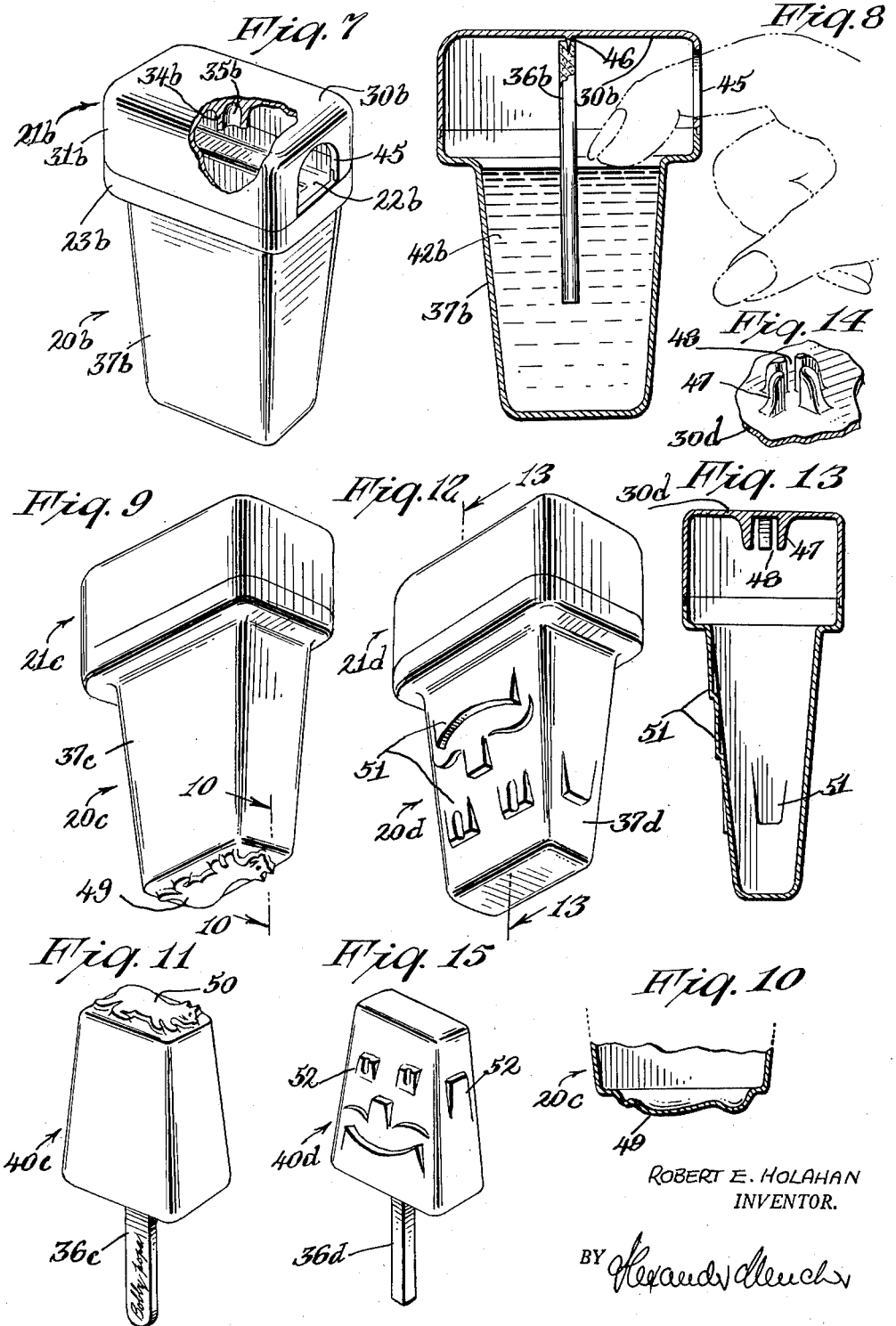
ROBERT E. HOLAHAN
INVENTOR.

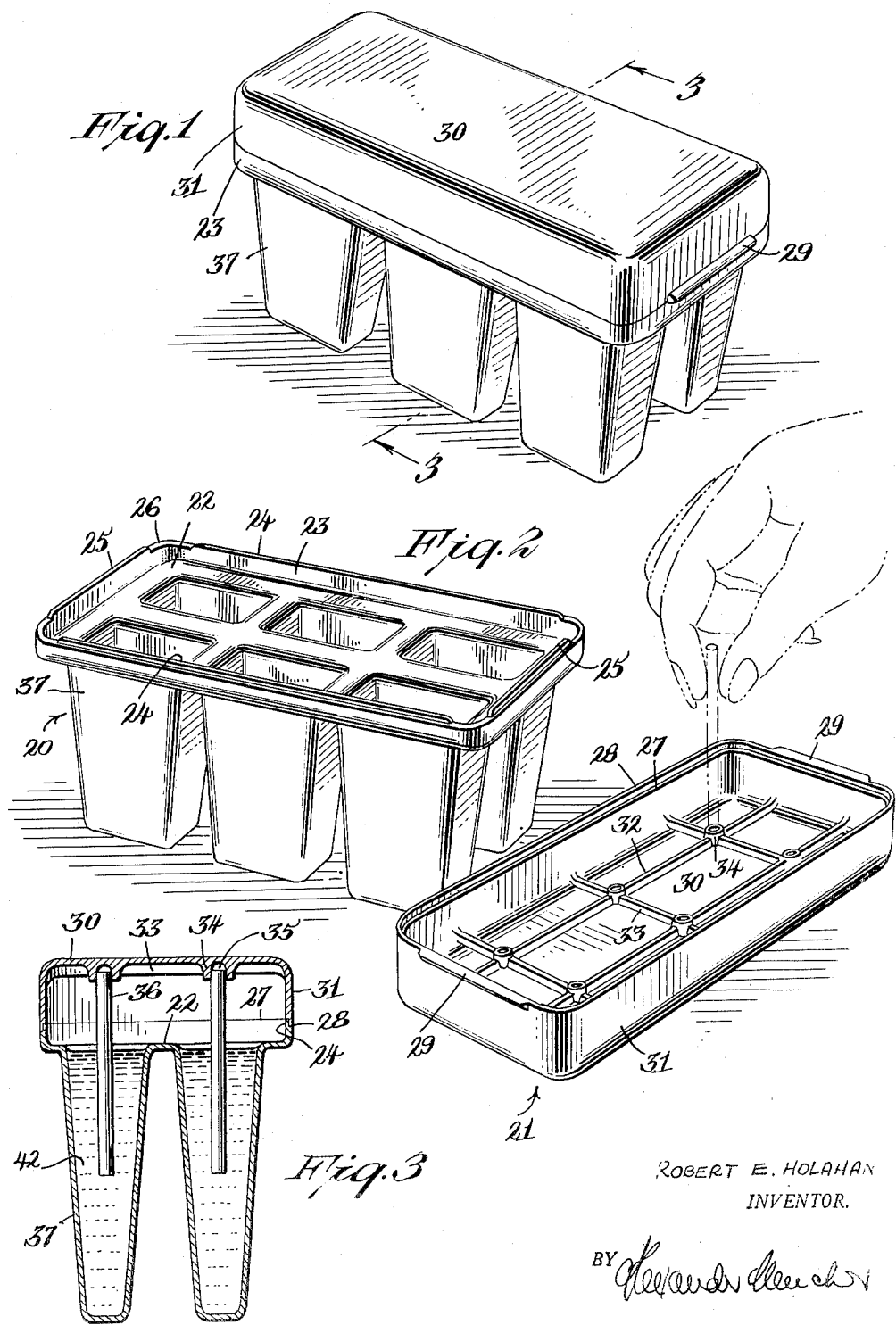

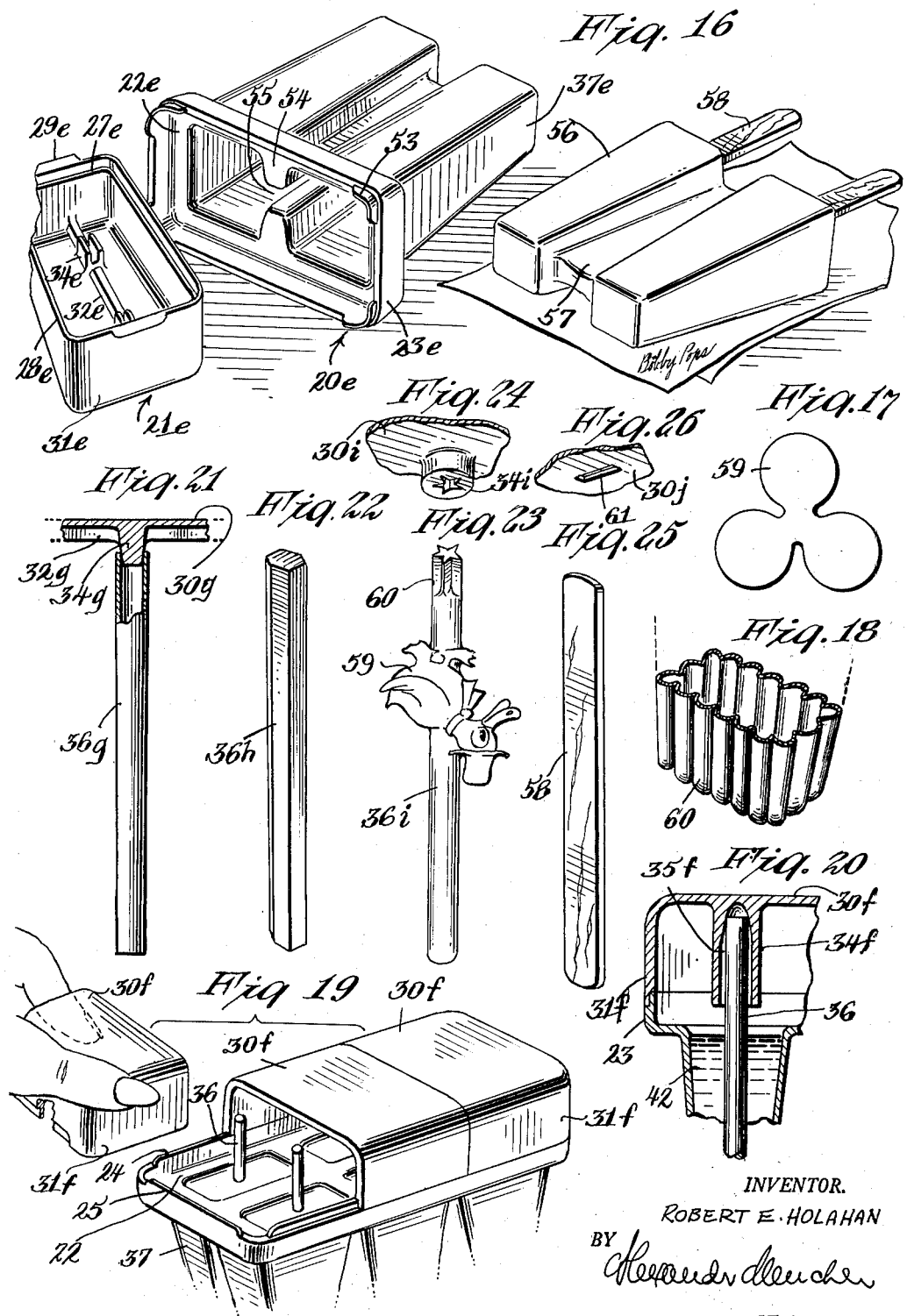

Patented Apr. 1, 1952

2,591,261

UNITED STATES PATENT OFFICE 2,591,261

CONFECTION MOLD

Robert E. Holahan, Rochester, N. Y.

Application November 30, 1949, Serial No. 130,165

2 Claims. (Cl. 107—19)

This invention relates generally to a confection forming device, but more particularly to such a device for home use.

In its preferred embodiments, the invention is disclosed in connection with the formation of chilled articles of confection of the nature of ice cream, ices, and the like, but it is understood that the invention may be used in connection with other types of frozen edibles.

The main object of the invention resides in the provision of a single and plural type of mold having a removable cover for confections adapted to be chilled in a home refrigerator for making homemade confections such as ice cream, ices, sherbets and the like said confections having a stick or holder secured thereto for handling and consumption, the cover member having common guiding and gripping elements on the underside for the introduction therein of holders which after the cover is applied to the mold project into the mold centrally and at the proper depth.

A further object of the invention resides in the provision of a mold for forming frozen confections provided with a removable cover member, the said cover member being inverted for introduction and gripping of holding sticks and wherein when the cover member is applied to the mold with its holding sticks secured thereto and depending therefrom the said sticks project into the mold receptacle or receptacles centrally and at the proper depth of the liquid or viscous confection mix. After chilling the cover member is removable from the mold free of the holding sticks due to the fact that the pressure about the lower end of said sticks after chilling or refrigeration is greater than the frictional or other type of hold of the upper ends of the holding sticks by the gripping means on the mold cover.

A further object of the invention resides in the provision of a combination mold and cover made of metal, composition or plastic material for forming frozen confections in the chilling compartments of home refrigerators which requires no specialized knowledge of know-how for operation, which has means for determining whether or not the confection within one or more of the mold receptacles is thoroughly chilled, which permits the forming of frozen confections of all shapes and sizes, which is easily introduced in and removed from the refrigerator and which assures non-contamination of the resultant frozen confections during chilling and during removal from the mold.

Other objects and advantages of the present invention will hereinafter appear more fully during the progress of the disclosure and as pointed out in the appended claims.

Accompanying this specification are drawings showing several embodiments of the invention wherein corresponding reference characters denote corresponding parts throughout the several views.

In the drawings:

Figure 1 is a view in perspective showing a multi-form mold having a cover thereon.

Figure 2 is a view in perspective of the multi-form mold showing the cover removed therefrom and in inverted position.

Figure 3 is a sectional view of Figure 1 across the plane 3—3 thereof.

Figure 4 is a view in perspective showing the manner in which the mold with cover attached, of Figures 1-3, is introduced into the chilling compartment of a home refrigerator by a house-wife and also shows the frozen confection held in the hand of a child and resulting from removal of the chilled confection from the mold.

Figure 5 is a view in perspective of a second embodiment of the invention showing a multi-form mold with cover attached, the cover having a central opening for determining the extent of chilling of the confection contents within the mold receptacle or receptacles.

Figure 6 is a sectional view of Figure 5 across the plane 6—6 thereof, and further shows the insertion of a finger through an opening in the cover to determine the extent of chilling of the confection within any of the mold receptacles.

Figure 7 is a view in perspective of a third embodiment of the invention showing a single mold compartment with a cover and opening therein, the said view also being partially cut away.

Figure 8 is a sectional view of Figure 7 showing further the introduction of a finger through the opening therein to determine extent of chilling, and further showing as distinguished from Figure 7 another type of guiding and attachment means for a holding member on the cover underside.

Figure 9 is a fourth embodiment of a single mold compartment in perspective with the cover attached showing at the bottom wall of the mold compartment and extending outwardly thereof a communicating animal mold form.

Figure 10 is a partial sectional view of Figure 9 across the plane 10—10 thereof.

Figure 11 is a view in perspective of the frozen confection with a holder attached resulting from chilling in the mold shown in Figure 9.

Figure 12 is a view of a fifth embodiment of the invention similar to the fourth embodiment except for differences in mold form to create the simulation of a face.

Figure 13 is a sectional view of Figure 12 across the plane 13—13 thereof and shows a square type of socket for a holder.

Figure 14 is a sectional view of a portion of the cover member shown in the fifth embodiment or in Figures 12 and 13 showing the said square type gripping and holding means for a holder or holding stick.

Figure 15 shows a frozen confection on a holding stick and is in the form of a square stick, the frozen confection having the shape of a face as derived from the mold shown in Figures 12 and 13.

Figure 16 is an assembly view in perspective showing a twin type of mold together with a cover and a frozen confection from such mold with holders therefor, the said confection being capable of being split between the joining rib.

Figure 17 is a top plan view of a shape derivable from a triple type of mold.

Figure 18 is a partial view in perspective showing a type of single mold for effecting a frozen confection having a fluted surface.

Figure 19 is an assembly view in perspective showing a seventh embodiment of the invention similar to the form of the invention shown in Figures 1–3 except for the fact that the cover member is divided into a plurality of parts so that a portion of the cover may be removed for removal of frozen confections in selected mold compartments.

Figure 20 is a partial sectional view of a mold and showing another form of gripping and guiding means for the holder or holding stick.

Figure 21 is a sectional view of a holding stick shown in the form of a hollow tube adapted to be held in position by gripping a stud depending from the underside of a cover member of a mold.

Figure 22 is a form of holding stick which is polygonal in cross section.

Figure 23 shows a holder having an ornamental decoration and having a star-shaped upper stem section.

Figure 24 shows the gripping member for the star-shaped upper stem section of the holder shown in Figure 23.

Figure 25 is a view of a flat type of holding stick.

Figure 26 shows the upper wall of a mold cover member with a rectangular slit for holding the stick shown on Figure 25.

In accordance with the invention, and in accordance with the preferred forms shown, numeral 20 generally indicates a multi-form mold having several receptacles while numeral 21 generally indicates the cover member therefor. Mold 21 consists of a pan 22 having an upstanding peripheral wall 23 provided with a peripheral top edge 26. Top edge 26 is provided with centering means for cover 21 and as shown has a pair of intermediate longitudinal indented ribs 24, while the side walls are similarly provided with a pair of intermediate and indented ribs 25. Ribs 24 and 25 are adapted to not only center the cover member generally designated by the number 21 about the receiving edge 26 but also to prevent displacement of said cover member.

Cover member 21 is provided with an open mouth having an outer edge 28 which is adapted to rest on edge 26 of the mold body 20 while a rabbeted edge or peripheral shoulder 27 is adapted to engage the upper edges of ribs 25 and 25. A pair of handles 29 extend from the upper edge 28 along the side walls of the cover to facilitate application and removal of cover 21 to and from mold body 20.

Cover 21 has side walls 31 and on the inner face of top wall 30 there are provided longitudinal ribs 32 and transverse ribs 33. As shown, at the intersection of these ribs are formed socket members 34 to receive and frictionally grip holding sticks 36, so that when cover member 21 is placed over mold body with the sticks already inserted said sticks are centrally positioned within the confection mix in liquid form. The sockets 34 are provided with openings 35 to receive the ends of the stick members 36.

As shown, the multi-form mold 20 is provided with a series of mold receptacles 37 wherein there are two receptacle rows there being three receptacles in each row, the mouth of the receptacles being formed integral with openings in the pan 22 of the mold body as best shown in Figure 2. The confection mix within each mold is indicated by numeral 42.

The mold body 20 may be made of any suitable material such as metal, composition or rubber, but as the invention is practiced, is made of plastic which has a smooth surface to enable easy withdrawal of the chilled confection from the receptacles. Thus after chilling cover member 21 is removed free of sticks 36 because the gripping power of the frozen confection about the lower ends of the sticks is greater than the gripping power of sockets 34. After the cover 21 is removed, the mold form is refrosted and then each of the sticks 36 is pulled up from the corresponding receptacle 37 and because of the smoothness of the receptacle inner walls, the frozen confection slides out.

In Figure 4 is shown a view of a housewife in the act of introducing the mold form with a confection mix therein and covered by cover 21 within the chilling compartment of a home refrigerator indicated by numeral 39. The chilling compartment is indicated by numeral 38 while the frozen confection with stick attached as indicated by numeral 40 is being held by a child. Numeral 43 indicates a series of sticks on a table while a jar 44 contains the mix in the form of a powder to facilitate preparation of the liquid mix for introduction into the receptacles 37 of mold form 20.

It will be noted that the combined extent of the peripheral wall of the pan or tray portion of the mold and of the cover member is at least the width of a human hand so that the stick when set in the confection will have a free portion for handling purposes in the manner illustrated in Fig. 4 by the grasp of the stick by the child.

In Figures 5 and 6 is shown a second embodiment of the invention wherein the mold form 20a and cover 21a is provided with four mold receptacles. The mold has a central aperture in the cover member 21a thereof to permit the consumer to determine by insertion of a finger whether or not the mix is completely chilled. Cover member 21a shows a central rectangular opening 41 therein while stick sockets 34a depend from the intersection of ribs 32a and 33a. A holding stick is indicated by numeral 36a. Each of the four individual mold receptacles is indicated by numeral 37a and the mix therein by 42a.

In Figures 7 and 8 is shown a third embodiment of the invention wherein a single mold device is shown indicated by numeral 20b with a cover member 21b. Cover 21b has opening 45 at the side thereof for introduction of a finger to determine the chilling degree of the mix. The single mold shown in Figure 7 is provided with a pan 22b having a peripheral wall 23b while the cover member therefor is provided with a top wall 30b, side walls 31b, a socket 34b and a hole 35b within the socket to receive a stick 36b. In Figure 8 the top wall 30b of the cover member instead of having the socket 34b is provided with a depending spike 46 into which the upper end of the stick is secured while the mix shown in the single form of the mold is indicated by numeral 42b.

In Figures 9, 10 and 11, a fourth embodiment of the invention is shown wherein a single mold form 20c is provided with a cover member 21c, the bottom of mold 37c has an impression mold portion in the form of an animal 49 so that the resultant frozen confection has a form shown in Figure 11 wherein the popsicle is indicated by numeral 40c, the figure by numeral 50 and a stick having a rectangular sectional form is indicated by numeral 36c.

In Figures 12, 13, 14 and 15 is shown a fifth embodiment of the invention wherein a single form of mold is indicated by numeral 20d, and a cover therefor is indicated by numeral 21d, the mold having indentations 51 on the side walls. In this fifth embodiment of the invention, it is to be noted that top wall 30d of cover member 21d has depending therefrom a plurality of lugs 47 to form a square opening 48 so that a square type of stick 36d may be gripped therein. The frozen confection coming from the mold shown in Figure 13 is shown in Figure 15 and has facial characteristics indicated by numerals 52.

A sixth type of mold form is shown in Figure 16. Here the mold is in the form of a twin type, the mold form being indicated generally by numeral 20e with a cover therefor 21e, the pan of the mold by numeral 22e, the side walls thereof by 23e, the rabbeted edge of the cover by 27e, the top edge of the cover by 28e, a longitudinal rib on the underside of the cover by 32e, and a gripping socket for a flat type of stick on the underside of cover 21e by 34e. The twin type of mold 20e is provided with corner projecting walls 53 to engage the inner sides to center and engage the rabbeted edge 27e of cover 21e while the pan 22e of the mold has two communicating receptacles 37e formed by a pair of opposing ribs 54 having an opening 55 therebetween. The mold receptacles 37e effectuate a pair of frozen confections indicated by numeral 56 joined by a rib 57 which may be split. Confection 56 has a holder 58 on each member which is rectangular in section and adapted to be gripped by the socket 34e.

Figure 17 indicates a plan view of a circular and triple form of mold confection as indicated by numeral 59, while Figure 18 indicates a single type of mold receptacle the side walls of which are fluted to create a fluted type of confection.

Figure 19 is a seventh embodiment of the invention, which is substantially similar to the embodiment of the invention shown in Figures 1-3 except for the fact that the cover member 30f is split into several parts to enable the user to withdraw particular confections from the multi-form mold at particular locations. Moreover, in the seventh embodiment of the invention the top wall 30f has depending from the underside thereof an elongated socket 34f having an opening 35f therein to grip a holding stick 36.

In Figure 21 is shown a holding stick 36g which is hollow and which is adapted to engage a stud 34g depending from the top wall 30g of an eighth embodiment of the invention, the said stud 34g extending from a rib 32g.

Figure 22 is another type of holding stick which is polygonal in cross section and which is indicated by numeral 36h. Figure 23 shows a type of holding stick 36i having a figure thereon 59 and a star-shaped upper end 60 of a stick which is adapted to engage a tenth embodiment of a socket 34i which contains a star-shape therein and which depends from the top wall 30i of a cover member.

In Figures 25 and 26 is shown an eleventh embodiment of a gripping member and a holding stick. As shown, a flat type of stick 58 is indicated while a top wall of cover member 30j has a rectangular opening 61 to grip the stick 58.

It is to be observed that the invention and all the embodiments thereof include a mold for the formation of frozen products with stick holders in a refrigerator for home use wherein guiding and gripping means for the holders depend from the inside of the cover member and wherein the cover member after chilling is removable from the mold free of the holding sticks. The sticks are secured to the frozen product and enable the user both to remove the frozen products from each of the mold receptacles after defrosting and to handle the products for eating purposes.

In preparing for the production of frozen confections the mold and cover are separated as shown in Figures 2 and 3 of the drawings and thereupon stick members are introduced into the sockets on the inner side of the cover member. When all the sticks have thus been introduced into the sockets and tested for firmness, the cover is placed on the mold and the centering means hereinbefore described for the cover member assure the sticks to be dipped into the mix which has been poured into the mold receptacles in proper position and at proper depth. It is to be noted that the sticks when introduced into the gripping means on the underside of the mold cover are manipulated to make sure that they are firmly held in place, as shown in Figure 2 of the drawings. Of course, the socket members, as indicated by numeral 34, are reinforced in those cases where ribs 32 and 33 or other corresponding rib members are provided.

After the mix is prepared and poured into the mold receptacles and after the cover member with the depending sticks is applied the device is put into the chilling compartment of the refrigerator and from this point on there is no danger of contamination of the contents. After chilling, the cover is removed from the mold free of the sticks as heretofore described. Thereupon, the mold with the frozen contents is defrosted by dipping in hot water or warm water to loosen the frozen confection from the side walls of the mold receptacles. In this process there is little danger of contaminating the contents. On the other hand, when the confection mix has been chilled, the mold with cover attached may be removed from the chilling compartment and dipped in warm water for purposes of loosening the frozen confection from the inner walls of the receptacle. Thereafter, by removing the cover the frozen confections are drawn from the respective receptacles as a unit and then the cover is placed on its back with the confections projecting upwardly. Thereupon, each confection is individually removed by removing the stick from its corresponding socket. In this case there is no danger whatsoever of contamination with respect to the product.

The invention herein is an improvement over the confection mold shown in my application for patent filed in the United States Patent Office on April 23, 1949, under Serial Number 89,343.

I wish it understood that minor changes and variations in the material, integration, location and duplication of parts of the invention may all be resorted to without departing from the spirit of the invention and the scope of the appended claims.

Furthermore, I wish it understood that the above described invention in addition to providing a structure for making frozen confections having a stem or stick embedded therein for the home also embraces the process of production. As has already been described this process essentially embraces the bringing of a stem releasably secured to and depending from a cover in contact with a body of edible substance in a mold receptacle by closing the said mold receptacle with the cover, the body of edible substance being fluid at normal temperatures and subjecting the mold receptacle and cover therefor with the contents to refrigeration whereby the contents are solidified and thereby attached to the stem by congelation.

I claim:

1. In combination with a confection molding tray for congelation purposes having a peripheral wall extending upwardly from the upper portion of said tray a cover member having a top wall and peripheral side walls depending therefrom, said top wall of the cover member having means lying above the tray and adapted to retain an end of a confection stick adjacent the inner face of the top wall so as to depend into the tray and means for interengaging the peripheral walls of the tray and cover member against lateral displacement from each other, the combined extent of the peripheral walls being at least the width of a human hand so that the stick when set in the confection will have a free portion for handling purposes.

2. In combination with a confection molding tray for congelation purposes having a peripheral wall extending upwardly from the upper portion of said tray a cover member having a top wall and peripheral side walls depending therefrom, said top wall of the cover member having means lying above the tray and adapted to retain an end of a confection stick adjacent the inner face of the top wall so as to depend into the tray and means for interengaging the peripheral walls of the tray and cover member against lateral displacement from each other, the combined extent of the peripheral walls being at least the width of a human hand so that the stick when set in the confection will have a free portion for handling purposes, said cover having an inspection opening of a size to permit testing the hardness of the confection during congelation.

ROBERT E. HOLAHAN.

REFERENCES CITED

The following references are of record in the file of this patent:

UNITED STATES PATENTS

| Number | Name | Date |
| --- | --- | --- |
| 1,470,525 | Burt | Oct. 9, 1923 |
| 1,628,434 | Schnaier | May 10, 1927 |
| 1,734,765 | Epperson | Nov. 5, 1929 |
| 1,919,692 | Falkendorf | July 25, 1933 |
| 2,019,875 | Suiter | Nov. 5, 1935 |
| 2,044,354 | Isenberg | June 16, 1936 |